Figure 1:
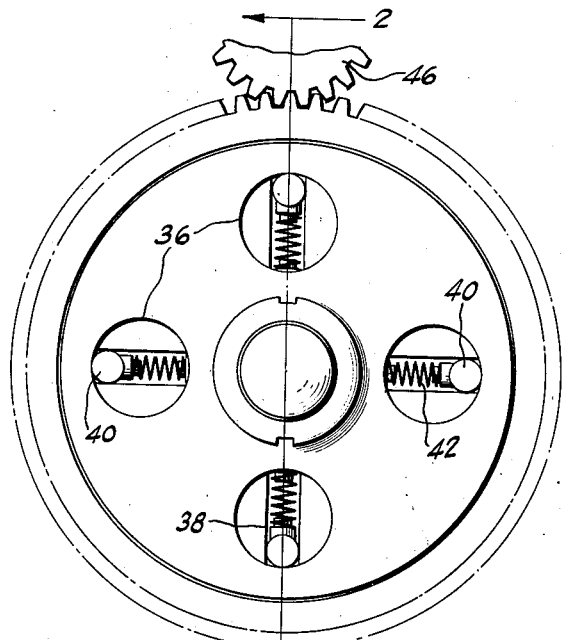

April 9, 1940.

G. L. WILLIAMS 2,196,716

TORQUE COUPLING

Filed May 26, 1938

INVENTOR.
George L. Williams
BY Harris G. Luther
ATTORNEY

Patented Apr. 9, 1940

2,196,716

UNITED STATES PATENT OFFICE 2,196,716

TORQUE COUPLING

George L. Williams, Manchester, Conn., assignor to United Aircraft Corporation, East Hartford, Conn., a corporation of Delaware Application May 26, 1938, Serial No. 210,251

7 Claims. (Cl. 64—27)

This invention relates to improvements in power transmitting means or torque couplings and has for an object the provision of an improved torque coupling arranged to substantially eliminate the transmission of vibration between a driving and driven element.

A further object resides in the provision of an improved vibration absorbing torque coupling which is effective to reduce the transmission of vibration between a driving and driven element over a large range of operating speeds.

A still further object resides in the provision in a torque coupling of the character described, of vibration absorbing elements which do not add materially to the weight of the device.

Other objects and advantages will be more particularly pointed out hereinafter or will become apparent as the description proceeds.

In the accompanying drawing, in which like reference numerals are used to designate similar parts throughout, there is illustrated, by way of example, a particular mechanical embodiment of the invention. The drawing, however, is for the purpose of illustration only and is not to be taken as in any way limiting or restricting the scope of the invention as set forth in the appended claims.

Figure 2:
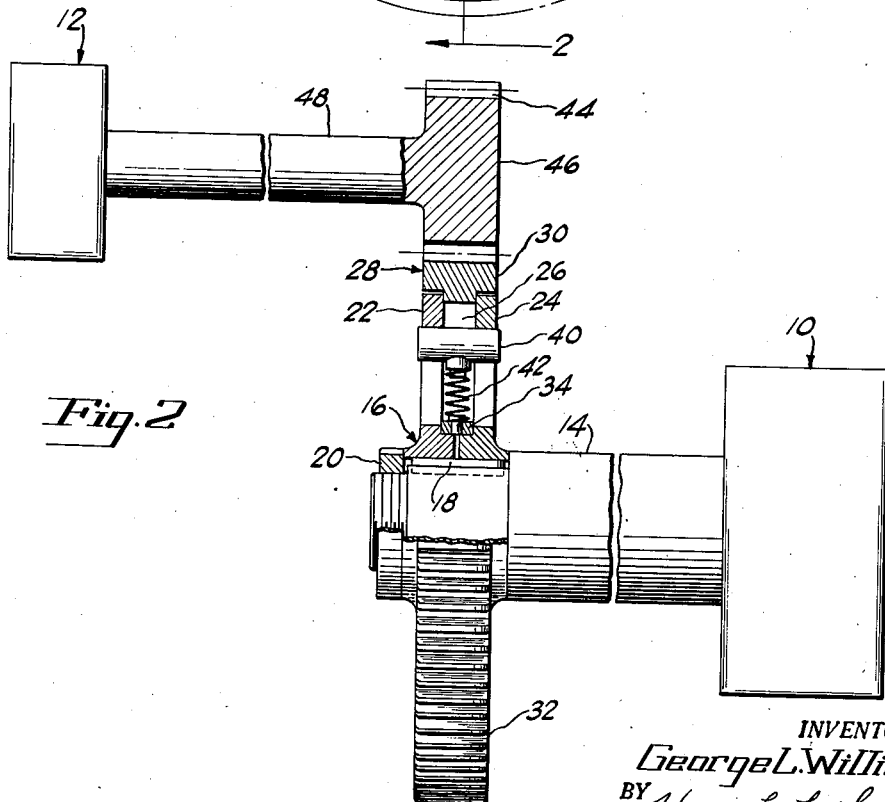

In the drawing,

Fig. 1 is an end elevational view of a power transmission or torque coupling constructed according to the invention and, Fig. 2 is a side elevational view of the coupling shown in Fig. 1, certain portions being broken away and shown in sections to better illustrate the construction thereof.

Referring to the drawing in detail, the numeral 10 generally indicates a machine element schematically illustrated as a simple disc which may be either a driving or driven element. The numeral 12 generally indicates a second machine element also schematically illustrated as a simple block and which may be a driving or driven element. For the purposes of this disclosure it will be assumed that the element 10 is the driving element and the element 12 the driven element and that the element 10 is subject to vibrational forces or motions from which it is desirable to isolate the element 12. This assumption is for the purposes of explanation only as it is obvious that the vibrational forces could exist in the driven element instead of in the driving element. For example, if the driving element is an internal combustion engine and the driven element is a propeller or supercharger impeller, the vibrational forces will be created in the engine and will be transmitted to the propeller or impeller unless effective means is provided to prevent such transmission, while, if the driving element is an electric motor and the driven element a reciprocating pump, the vibration forces will be created in the pump and will affect the motor unless their transmission from the pump to the motor be eliminated.

Assuming that the element 10 in the construction illustrated is the driving element, this element will apply a driving torque to the shaft 14 and will also apply to the shaft a torsional vibration which will render the shaft motion somewhat irregular.

A hub member generally indicated as 16 is rigidly secured to the shaft 14 by suitable means such as the key 18 and nut 20 and rotates with the shaft. This hub member comprises to annular disc portions 22 and 24 of substantially equal dimensions separated by an annular space or groove 26. The hub member is preferably made in two separable portions divided along a plane lying within the groove 26, so that the flange members 22 and 24 may be separated in order to assemble with the hub member the gear element generally indicated at 28. The gear element 28 comprises an annular ring portion 30 provided about its periphery with gear teeth 32 and having an inwardly extending radial web or flange 34 occupying substantially all of the space 26 between the disc members 22 and 24.

Apertures 36 are provided in the disc members, extending entirely through both disc members and having their centers equally spaced about a circle whose radius is less than the maximum radius of the disc members so that the apertures lie entirely within the outer circumference of the disc members. The web portion 34 of the gear element 28 is provided with a plurality of radial slots 38 so spaced about the annular web that their longitudinal axes coincide with the centers of the apertures 36 when the gear element 28 is in assembled relation with the hub element 16.

A cylindrical element, as indicated at 40 extends through each radial slot 38 and through the corresponding pair of apertures 36 in the respective disc members 22 and 24, the length of the cylindrical weight or roller 40 being slightly greater than the thickness of the hub member 16 at the location of the apertures 36 and the diameter of each roller being materially less than the diameter of the corresponding apertures. Each of the weights 40 is held in its radially outward position by means of a light coil spring as indicated at 42, interposed between the weight and the bottom or radially inward portion of the corresponding slot 38.

The teeth 32 of the gear element 28 mesh with corresponding teeth 44 on a rotatable gear element 46 fixed upon the shaft 48 which drives the driven element 12. It is understood, of course, that other gears may be inserted between the gears 30 and 46 if desired.

In operation, the driving force exerted between the hub member 16 and the gear element 28 tends to rotate the hub member with respect to the gear member. This tendency toward relative rotation between these two members tends to move the weights 40 in the apertures 36. As the weights bear at their ends against the outer portions of the apertures, as is clearly illustrated in Fig. 2, a movement of the weights in the apertures will force the weight inwardly in the radial slots 38. When the gear element is rotating at speed, centrifugal force acting on the weights tends to keep them in their outermost position in the apertures and acts to keep the apertures 36 centered with respect to the slots 38, as is shown in Fig. 1. Whenever a driving torque is being exerted between the gears 28 and 46 the weights will be moved toward one side of the apertures 36 until the driving force tending to rotate the gear portion 28 relative to the hub 16 is balanced by the component of centrifugal force acting to restore the weights to their outermost position. If the driving motion varies due to torsional vibration the weights 40 will move along the side of apertures 36 to allow sufficient relative rotation between the members 28 and 16 to prevent transmission of motion to the driven member.

The proportions of the members of the coupling may be so arranged that a substantially constant torque will be supplied to the driven member in spite of vibration or non-uniform motion of the driving member. Relative motion between members 28 and 16 will produce a corresponding radial motion of the cylindrical weights in the radial slots. This motion or vibration of the weights will set up a radial component of force which will alternately add to and substract from the centrifugal force acting on the weights due to rotation of the coupling. The arrangement is such that the tangential or driving component of the centrifugal force is a maximum when the weights are furtherest from the outermost position. In this position of maximum tangential component the inertia force due to the radial motion of the weights will subtract from the centrifugal force and it is apparent that by suitable design the increase in tangential component may be offset by the decrease in net radial force so that a substantially constant turning effort may be supplied through the coupling.

This coupling is especially well suited for propeller and supercharger applications where the torque to be transmitted varies as the square of the speed since the torque capacity of the coupling, depending on centrifugal force, also varies as the square of the speed. As a result, the coupling may operate through a wide range of speeds on propeller load without change in deflection.

An alternative feature of this coupling lies in the fact that since the spring rate depends on the square of the speed, the natural frequency of the system in which the coupling is used may be made to vary directly with engine speed and thus bear a constant ratio to the frequency of crankshaft rotation.

It is apparent that since deflection due to vibration may occur between the members of the coupling without transmission of motion or torque variation, practically no vibration will be transmitted between the driving and driven elements.

Furthermore, the possibility of a critical speed or resonant vibration between the driving and driven elements may be excluded since the coupling may be designed so that it will not transmit a torque variation due to vibration at a particular frequency or may be designed such that the natural frequency of the system including the driving and driven members will always bear a constant ratio to the speed of rotation. It has also been found that the flexible coupling may be so designed that it is directly responsive to or "tuned" to a vibration frequency or harmonic occurring at some particular multiple of rotational speed and if so designed, is effective to substantially eliminate vibration impulses at that particular frequency.

The rollers 40, the apertures 36, and the distance of the rollers from the center of rotation may be dimensioned according to the magnitude of the driving force and the amplitude and frequency of the vibration which it is desired to eliminate.

The apertures 36 have been shown as circular but they may be non-circular if desired and the track of the rollers 40 may be a curve designed to provide a particular vibration damping effect. In the construction illustrated each aperture 36 entirely surrounds the corresponding end of its respective roller 40 so that there is always a limit in both directions to relative rotation between the members 16 and 28. If the device is rotated at very slow speed so that there is not sufficient centrifugal force acting on the rollers 40 to tend to center the apertures with respect to the slots 38 the rollers will occupy a position at one side or the other of the respective apertures and the driving force will still be transmitted through the rollers between the members 16 and 28. As the speed increases centrifugal force will tend to move the rollers outwardly and provide a centrifugal spring or cushion drive between the hub 16 and the gear 28.

The springs 42 are for the purpose of urging the rollers towards their outermost position and preventing them from moving freely in the respective slots 38 when the device is rotating at a slow speed, as when the drive is being started or discontinued, the purpose being mainly to eliminate a noisy slow speed operating condition and also to have the rollers in their proper operative position when the driving force is applied.

While a particular mechanical embodiment has been illustrated and described for the purpose of disclosing the invention, it is to be understood that the invention is not limited to the particular construction so illustrated and described, but that such changes in the size, shape and arrangement of parts may be resorted to as come within the scope of the sub-joined claims.

Having now described the invention so that others skilled in the art may clearly understand the same, what it is desired to secure by Letters Patent is as follows:

What is claimed is:

1. A torque coupling comprising an element concentric with a shaft and having radial slots therein, weights guided in a radial path by said slots and constrained to turn with said element, a second element concentric with the first said element and having substantially circular eccentric apertures therein forming tracks for said weights to cause radial movement of the weights upon relative movement of said elements.

2. A vibration absorbing torque coupling for operatively connecting a driving element to a driven element comprising, a hub member having a disk shaped outer portion with a plurality of circular apertures therethrough, an annular member having a web portion overlying the outer portion of said hub member and carried thereby and having a plurality of elongated apertures therethrough having a less circumferential extent than the maximum circumferential extent of said circular apertures and registering with said circular apertures, and relatively free cylindrical weights inserted in said registering apertures in the coextensive portions of said members.

3. A vibration absorbing coupling for a driving and a driven element comprising, a hub member having its outer portion in the form of a pair of spaced apart disks having registering apertures therethrough, an annular member surrounding said hub member and having an internal web received in the space between the disk portions of said hub member, and provided with radial slots registerable with the apertures in said hub member, and a cylindrical weight in each slot extending at its ends through registering apertures in the hub member.

4. A vibration absorbing coupling for a driving and a driven element comprising, a hub member having an annular groove and spaced circular apertures extending through the portions thereof on opposite sides of said groove, an annular member surrounding said hub member and having an internal web extending into said groove and having radial slots registerable with the apertures in said hub member, and a cylindrical weight having a diameter less than the diameter of said apertures carried in each radial slot and extending through registering apertures in said hub member.

5. A vibration absorbing coupling for a driving and a driven element comprising, a hub member having an annular groove and spaced circular apertures extending through the portions thereof on opposite sides of said groove, an annular member surrounding said hub member and having an internal web extending into said groove and having radial slots registerable with the apertures in said hub member, and a cylindrical roller having a diameter less than the diameter of said apertures carried in each radial slot and extending through registering apertures in said hub member, and spring means resiliently urging each roller toward a radially outward position in the respective apertures.

6. In combination with a drive shaft and a driven shaft, a vibration reducing torque coupling comprising, a hub member on said driven shaft including two separable spaced apart disk portions having spaced circular apertures therethrough, a gear on said driven shaft, a gear element meshing with said driven shaft gear and surrounding said hub member, an internal radial flange on said gear element disposed in the space between said disk portions and having spaced radial slots therethrough registering with said apertures, and a roller extending through each pair of circular apertures in said disk portions and the registering slot in said flange, said rollers being dimensioned in proportion to the magnitude of the transmitted torque and the rotational speed of said torque coupling.

7. In combination with a drive shaft and a driven shaft, a vibration reducing torque coupling comprising, a hub member on said driven shaft including two separable spaced apart disk portions having spaced circular apertures therethrough, a gear on said driven shaft, a gear element meshing with said driven shaft gear and surrounding said hub member, an internal radial flange on said gear element disposed in the space between said disk portions and having spaced radial slots therethrough registering with said apertures, and a roller extending through each pair of circular apertures in said disk portions and the registering slot in said flange, said rollers being dimensioned in proportion to the magnitude of the transmitted torque and the rotational speed of said torque coupling, and the amplitude and frequency of vibrational forces between the driving and driven shafts.

GEORGE L. WILLIAMS.